(12) United States Patent
Nagai

(10) Patent No.: US 11,412,140 B2
(45) Date of Patent: Aug. 9, 2022

(54) ELECTRONIC DEVICE, CONTROL METHOD OF ELECTRONIC DEVICE, AND NON-TRANSITORY COMPUTER-READABLE STORAGE MEDIUM

(71) Applicant: CANON KABUSHIKI KAISHA, Tokyo (JP)

(72) Inventor: Keita Nagai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/323,875

(22) Filed: May 18, 2021

(65) Prior Publication Data
US 2021/0368100 A1 Nov. 25, 2021

(30) Foreign Application Priority Data
May 21, 2020 (JP) .............................. JP2020-088583

(51) Int. Cl.
| | | |
|---|---|---|
| *H04N 5/225* | (2006.01) | |
| *H04N 5/232* | (2006.01) | |
| *G06F 3/01* | (2006.01) | |
| *G06T 7/80* | (2017.01) | |

(52) U.S. Cl.
CPC ......... *H04N 5/23245* (2013.01); *G06F 3/013* (2013.01); *G06T 7/80* (2017.01); *H04N 5/23219* (2013.01); *H04N 5/232941* (2018.08); *G06T 2207/30196* (2013.01)

(58) Field of Classification Search
CPC ............. H04N 13/383; H04N 5/23219; H04N 5/22525; H04N 5/23293; G06F 3/013; G06K 9/6215
See application file for complete search history.

(56) References Cited

U.S. PATENT DOCUMENTS

| | | | | |
|---|---|---|---|---|
| 11,076,147 B2* | 7/2021 | MacKenzie | .......... | H04N 13/398 |
| 2002/0176708 A1* | 11/2002 | Irie | .......... | G03B 13/02 |
| | | | | 396/51 |
| 2013/0169754 A1* | 7/2013 | Aronsson | ............ | H04N 13/383 |
| | | | | 348/169 |
| 2015/0009313 A1* | 1/2015 | Noda | .......... | G06V 40/40 |
| | | | | 348/78 |
| 2015/0355463 A1* | 12/2015 | Sako | .......... | H04N 13/398 |
| | | | | 345/2.1 |
| 2016/0034030 A1* | 2/2016 | Lee | .......... | G06F 3/013 |
| | | | | 345/156 |
| 2016/0134863 A1* | 5/2016 | Horesh | ............ | G06F 3/0304 |
| | | | | 348/78 |

(Continued)

FOREIGN PATENT DOCUMENTS

JP 2009251658 A 10/2009

*Primary Examiner* — Twyler L Haskins
*Assistant Examiner* — Dwight Alex C Tejano
(74) *Attorney, Agent, or Firm* — Canon U.S.A., Inc. I.P. Division

(57) ABSTRACT

An electronic device comprising: a line-of-sight detection unit configured to receive line-of-sight input from a user and detect a viewed position of the user; an acquisition unit configured to acquire first distance information that corresponds to a distance to an eye of the user; and a control unit configured to 1) set determination time based on the first distance information, and 2) determine that gaze has occurred, in a case where determination is made that the viewed position does not continuously change longer than the determination time.

19 Claims, 5 Drawing Sheets

(56) References Cited

U.S. PATENT DOCUMENTS

| | | | |
|---|---|---|---|
| 2016/0139665 A1* | 5/2016 | Lopez | G06F 3/013 |
| | | | 345/156 |
| 2016/0195924 A1* | 7/2016 | Weber | G06F 3/013 |
| | | | 345/156 |
| 2017/0353659 A1* | 12/2017 | Hoshina | G06F 1/3265 |
| 2018/0039327 A1* | 2/2018 | Noda | H04N 5/23218 |
| 2018/0227481 A1* | 8/2018 | Kimura | H04N 5/23219 |
| 2019/0220091 A1* | 7/2019 | Yu | G06F 1/1601 |

\* cited by examiner

ELECTRONIC DEVICE, CONTROL METHOD OF ELECTRONIC DEVICE, AND NON-TRANSITORY COMPUTER-READABLE STORAGE MEDIUM

BACKGROUND OF THE INVENTION

Field of the Invention

The present invention relates to an electronic device, a control method of the electronic device, and a non-transitory computer-readable storage medium.

Description of the Related Art

Various cameras that detect the line-of-sight direction of a user (photographer), detect a region (position) in a finder visual field viewed by the photographer, and control various image capturing functions, such as automatic focus control and automatic exposure control, have been proposed. Japanese Patent Application Publication No. 2009-251658 discloses a technique for a display device in which the line-of-sight of the user is detected and in which when the time, during which the line-of-sight of the user is fixed to a certain region, exceeds a predetermined threshold, it is determined that the user is gazing at the region, whereby a predetermined control is performed.

A problem of a conventional electronic device used for light-of-sight detection is that the accuracy of detecting the line-of-sight drops when the positional relationship between the eye of the user and the electronic device changes. A method of solving this problem is performing calibration before using the electronic device, so that line-of-sight input can be accurately performed at the position of the eye when the electronic device is used. However, if the position of the eye of the user moved from the position at the point of calibration, an incorrect line-of-sight may be detected, which may make it impossible to display the gaze position and perform operation based on line-of-sight input as intended by the user.

SUMMARY OF THE INVENTION

With the foregoing in view, it is an object of the present invention to provide an electronic device that can perform operation based on the line-of-sight input as intended by the user, even in a case where the positional relationship between the eye of the user and the electronic device changes.

A first aspect of the present invention is: an electronic device comprising at least one memory and at least one processor which function as: a line-of-sight detection unit configured to receive line-of-sight input from a user and detect a viewed position of the user; an acquisition unit configured to acquire first distance information that corresponds to a distance to an eye of the user; and a control unit configured to 1) set determination time based on the first distance information, and 2) determine that gaze has occurred, in a case where determination is made that the viewed position does not continuously change longer than the determination time.

A second aspect of the present invention is: a control method of an electronic device including a line-of-sight detection unit configured to receive line-of-sight input from a user and detect a viewed position of the user, the method comprising: an acquisition step of acquiring first distance information that corresponds to a distance to an eye of the user; and a control step of 1) setting determination time based on the first distance information and 2) determining that gaze has occurred in a case where determination is made that the viewed position does not continuously change longer than the determination time.

Further features of the present invention will become apparent from the following description of exemplary embodiments with reference to the attached drawings.

DESCRIPTION OF THE EMBODIMENTS

First Embodiment

Figure 1A:
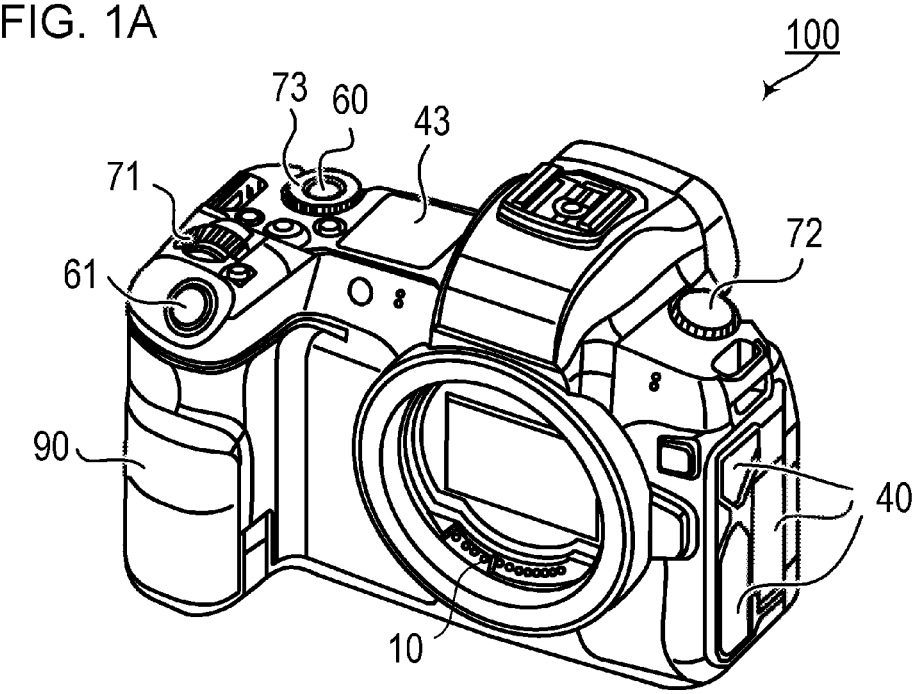
FIGS. 1A and 1B are external views of a digital camera according to a first embodiment.
Figure 1B:
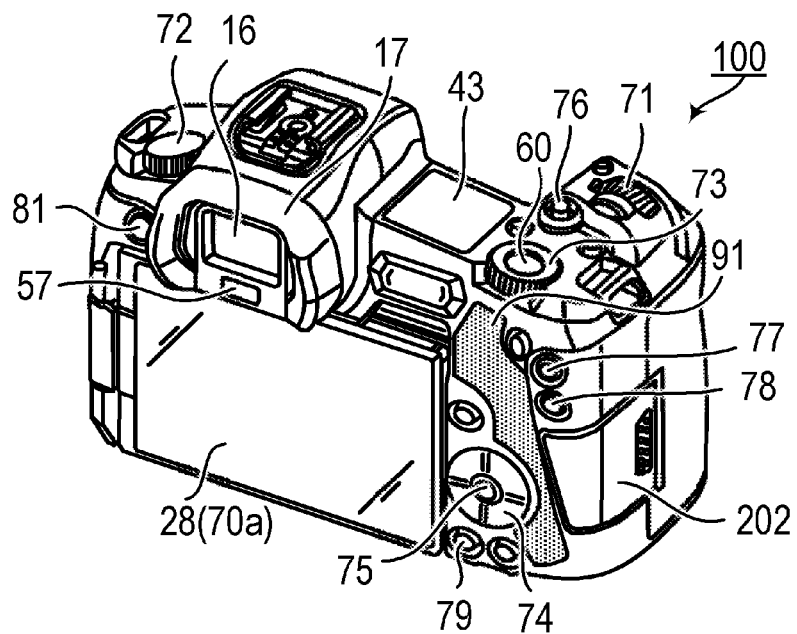

<External View of Digital Camera 100>: Preferred embodiments of the present invention will be described with reference to the drawings. FIGS. 1A and 1B are external views of a digital camera 100 which is an example of a device to which the present invention is applicable. FIG. 1A is a front perspective view of the digital camera 100, an FIG. 1B is a rear perspective view of the digital camera 100.

A display unit 28 is a display unit disposed on a rear surface of the digital camera 100, and displays images and various information. A touch panel 70a can detect a touch operation performed on a display surface (touch operation surface) of the display unit 28. An outer finder display unit 43 is a display unit disposed on an upper surface of the digital camera 100, and displays various set values of the digital camera 100, such as the shutter speed and aperture. A shutter button 61 is an operation member to instruct image capturing. A mode selection switch 60 is an operation member to switch between various modes. Terminal covers 40 are covers to protect connectors (not illustrated) to connect the digital camera 100 to an external device.

A main electronic dial 71 is a rotational operation member, and such set values as the shutter speed and aperture can be changed by turning the main electronic dial 71. A power switch 72 is an operation member to switch the power supply of the digital camera 100 ON/OFF. A sub-electronic dial 73 is a rotational operation member, and movement of a selection frame (cursor) and image switching, for example, can be performed by turning the sub-electronic dial 73. A four-direction key 74 is configured such that the upper part, lower part, left part and right part of the key can be pressed respectively, so that processing corresponding to the pressed part of the four-direction key 74 can be performed. A SET button 75 is a push button, and is mainly used to determine a selected item.

A video button 76 is used to start or stop capturing (recording) moving images. An AE lock button 77 is a push button, and an exposure state can be fixed by pressing the AE lock button 77 in an image capturing standby state. A magnifying button 78 is an operation button to switch a magnifying mode in a live view display (LV display) of an image capturing mode ON/OFF. If the main electronic dial 71 is operated after setting the magnifying mode to ON, the live view image (LV image) can be magnified or demagnified. In a reproduction mode, the magnifying button 78 functions as an operation button to magnify a reproduced image or to increase the magnification ratio thereof. A reproduction button 79 is an operation button to switch between the image capturing mode and the reproduction mode. If the reproduction button 79 is pressed in the image capturing mode, the mode changes to the reproduction mode, whereby the latest image, out of the images recorded in a recording medium 200 (described later), can be displayed on the display unit 28. A menu button 81 is a push button which is used to instruct to display a menu screen, and if the menu button 81 is pressed, the menu screen, which allows various settings, is displayed on the display unit 28. The user can intuitively perform various settings using the menu screen displayed on the display unit 28, the four-direction key 74, the SET button 75, and the like.

A communication terminal 10 is a communication terminal for the digital camera 100 to communicate with a detachable lens unit 150 (described later). An eyepiece unit 16 is an eyepiece unit of an eyepiece finder (peep type finder), and the user can view an image displayed on an internal EVF 29 (described later) via the eyepiece unit 16. An eye approach detection unit 57 is an eye approach detection sensor to detect whether an eye of the user (photographer) is approaching the eyepiece unit 16. A cover 202 is a cover of a slot to store a recording medium 200 (described later). A grip unit 90 is a holding unit having such a shape that the user can easily hold the digital camera 100 with their right hand to capture images. When the user holds the digital camera 100 by gripping the grip unit 90 with the little finger, ring finger and middle finger of their right hand, the shutter button 61 and the main electronic dial 71 are in positions that can be operated by the index finger of the right hand. In this state, the sub-electronic dial 73 is disposed in a position that can be operated by the thumb of the right hand. A thumb rest unit 91 (thumb standby position) is a grip member that is disposed on the rear surface side of the digital camera 100, in a position where the thumb of the right hand holding the grip unit 90 can easily be placed in a state of not operating any operation member. The thumb rest unit 91 is constituted of a rubber member or the like, to increase a holding force (gripping sensation).

Figure 2:
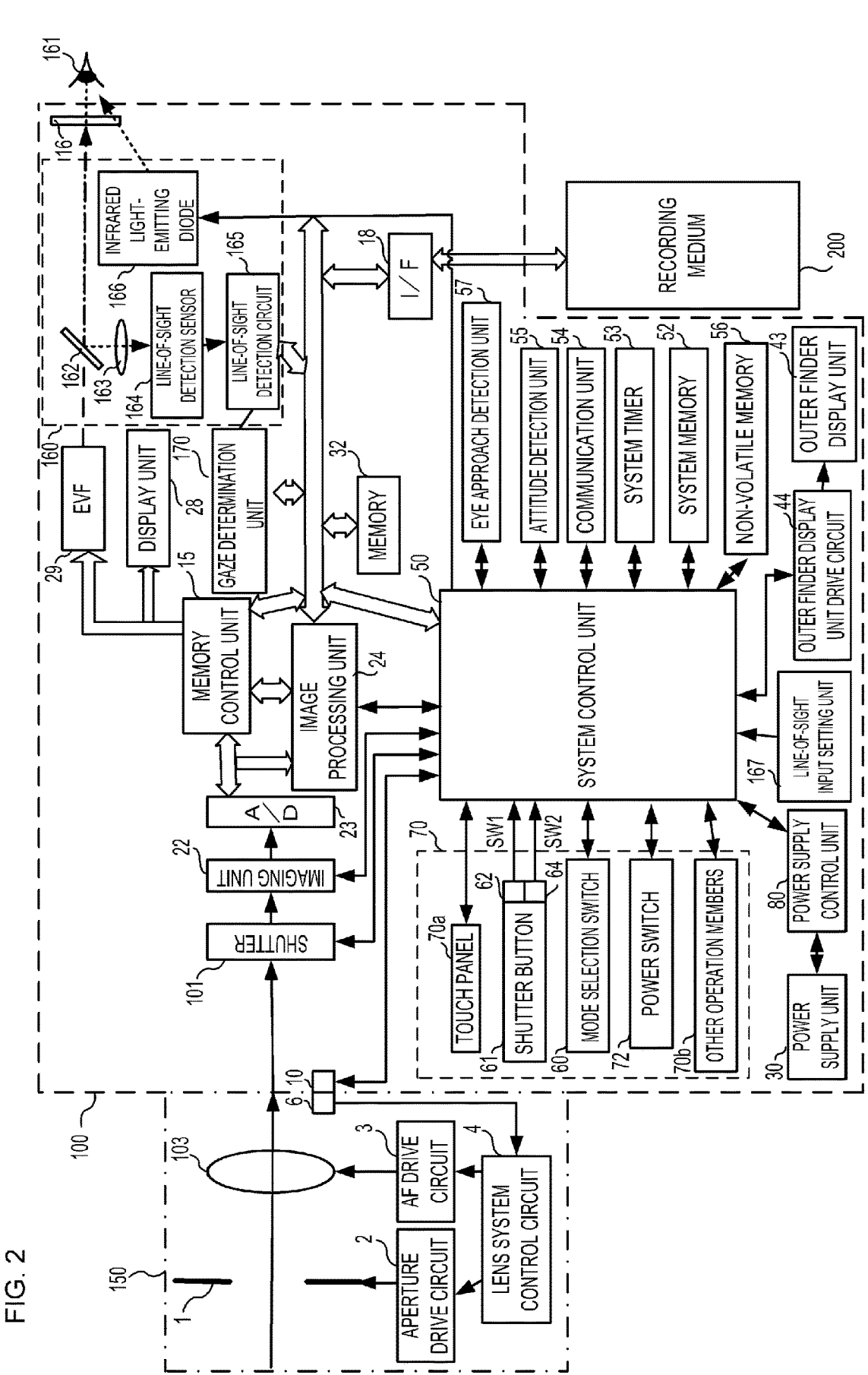
FIG. 2 is a block diagram of the digital camera according to the first embodiment.

<Block Diagram of Digital Camera 100>: FIG. 2 is a block diagram depicting a configuration example of the digital camera 100. A lens unit 150 is a lens unit equipped with a replaceable image capturing lens. A lens 103 is normally constituted of a plurality of lenses, but is illustrated as one lens in FIG. 2 for simplification. A communication terminal 6 is a communication terminal for the lens unit 150 to communicate with the digital camera 100, and a communication terminal 10 is a communication terminal for the digital camera 100 to communicate with the lens unit 150. The lens unit 150 communicates with a system control unit 50 via these communication terminals 6 and 10. Then the lens unit 150 controls an aperture 1 via an aperture drive circuit 2, using an internal lens system control circuit 4. The lens unit 150 also performs focusing by moving the lens 103 via an AF drive circuit 3 using the lens system control circuit 4.

A shutter 101 is a focal plane shutter which can freely control the exposure time of an imaging unit 22 based on the control by the system control unit 50.

The imaging unit 22 is an image pickup element constituted of a CCD, a CMOS element or the like, to convert an optical image into electric signals. The imaging unit 22 may include an imaging plane phase-difference sensor, which outputs defocus amount information to the system control unit 50.

An image processing unit 24 performs predetermined processing (pixel interpolation, resizing processing (e.g. demagnification), color conversion, or the like) on the data from an A/D convertor 23 or the data from a memory control unit 15. The image processing unit 24 also performs predetermined arithmetic processing using the captured image data, and the system control unit 50 performs exposure control and distance measurement control based on the arithmetic result acquired by the image processing unit 24. Thereby through-the-lens (TTL) type auto focus (AF) processing, auto exposure (AE) processing, pre-flash emission (EF) processing, and the like are performed. Furthermore, the image processing unit 24 performs predetermined arithmetic processing using the captured data, and performs TTL type auto white balance (AWB) processing based on the acquired arithmetic result.

The memory control unit 15 controls data transmission/reception among the A/D convertor 23, the image processing unit 24 and the memory 32. The output data from the A/D convertor 23 is written to the memory 32 via the image processing unit 24 and the memory control unit 15. In some cases, the output data from the A/D convertor 23 may be written to the memory 32 via the memory control unit 15 without using the image processing unit 24. The memory 32 stores image data which was acquired by the imaging unit 22 and converted into digital data by the A/D convertor 23, and also stores image data to be displayed on the display unit 28 or the EVF 29. The memory 32 has a storage capacity that is sufficient to store a predetermined number of still images and a predetermined duration of moving images and sounds.

The memory 32 is also a memory for image display (video memory). The image data for display, which is written in the memory 32, is displayed on the display unit 28 or the EVF 29 via the memory control unit 15. The display unit 28 and the EVF 29 perform display in accordance with the signals from the memory control unit 15 respectively, on such a display as an LCD and an organic EL. If data, which was A/D-converted by the A/D convertor 23 and stored in the memory 32, is sequentially transferred to and displayed on the display unit 28 or the EVF 29, live view display (LV display) can be performed. An image displayed on the live view display is referred to as a "live view image (LV image)".

A line-of-sight detection unit 160 detects the line-of-sight of the user in the eyepiece unit 16. The line-of-sight detection unit 160 is constituted of a dichroic mirror 162, an image forming lens 163, a line-of-sight detection sensor 164, a line-of-sight detection circuit 165, and an infrared light-emitting diode 166. The line-of-sight detection unit 160 may be regarded as a part of the operation unit 70, since the system control unit 50 may execute predetermined processing in accordance with detection of the line-of-sight.

An infrared light-emitting diode 166 is a light-emitting element to detect a viewed position of the user in a finder screen, and emits an infrared light to an eyeball (eye) 161 of the user. The infrared light emitted from the infrared light-emitting diode 166 is reflected by the eyeball (eye) 161, and this infrared reflected light reaches the dichroic mirror 162. The dichroic mirror 162 reflects only the infrared light, and allows visible light to pass. The infrared reflected light, of which optical path is changed, forms an image on an imaging surface of the line-of-sight detection sensor 164 via the image forming lens 163. The image forming lens 163 is an optical member which constitutes the line-of-sight detection optical system. The line-of-sight detection sensor 164 is constituted of an imaging device, such as a CCD type image sensor.

The line-of-sight detection sensor 164 performs photoelectric conversion on the entered infrared reflected light, and outputs the generated electric signals to the line-of-sight detection circuit 165. The line-of-sight detection circuit 165 detects the viewed position of the user from the movement of the eyeball (eye) 161 of the user, based on the output signals of the line-of-sight detection sensor 164, and outputs the detected information to the system control unit 50 and a gaze determination unit 170.

A line-of-sight input setting unit 167 sets enable/disable of the line-of-sight detection by the line-of-sight detection circuit 165 (line-of-sight detection unit 160). The line-of-sight input setting unit 167 also sets enable/disable of processing based on the line-of-sight input by the system control unit 50. For example, the user can freely set these settings of enable/disable in the menu setting by operating the operation unit 70.

A gaze determination unit 170 determines that the user is gazing at a region in a case where a period when the line-of-sight of the user is fixed on this region exceeds a predetermined threshold, based on the detected information received from the line-of-sight detection circuit 165. Therefore, this region can be regarded as a gaze position (gaze region) at which the user is gazing. A "line-of-sight is fixed on a region" refers to an average position of the moving line-of-sight that is within this region until a predetermined period is elapsed, and variation (dispersion) thereof is less than a predetermined value. The predetermined threshold can be freely changed by the system control unit 50. The gaze determination unit 170 need not be an independent block, and the system control unit 50 may execute the same function as the gaze determination unit 170 based on the detected information received from the line-of-sight detection circuit 165.

On the outer finder display unit 43, various set values of the camera, such as the shutter speed and aperture, are displayed via an outer finder display unit drive circuit 44.

A non-volatile memory 56 is a memory which is electrically erasable and recordable, such as a flash ROM. In the non-volatile memory 56, constants and programs for operating the system control unit 50, for example, are recorded. "Programs" here refers to programs for executing various flow charts described later in this embodiment.

The system control unit 50 is a control unit constituted of at least one processor or circuit, and controls the digital camera 100 in general. The system control unit 50 implements each processing step of this embodiment (described later) by executing the programs recorded in the abovementioned non-volatile memory 56. A system memory 52 is a RAM, for example, and the system control unit 50 develops the constants and variables for operating the system control unit 50 and programs read from the non-volatile memory 56, in the system memory 52. The system control unit 50 also controls the display by controlling the memory 32, the display unit 28, and the like.

A system timer 53 is a clock unit that measures the time used for various controls and a time of the internal clock.

A power supply control unit 80 is constituted of a battery detection circuit, a DC-DC convertor, a switch circuit to switch blocks to be energized, and the like, and detects whether a battery is installed, a type of battery, and the residual amount of battery power, for example. The power supply control unit 80 also controls the DC-DC convertor based on this detection result and the instruction from the system control unit 50, and supplies the required voltage to each unit, including the recording medium 200, for a required period of time. A power supply unit 30 is constituted of a primary battery (e.g. alkali battery, lithium battery), a secondary battery (e.g. NiCd battery, NiMH battery, Li battery), an AC adaptor, and the like.

A recording medium I/F 18 is an interface with the recording medium 200 (e.g. memory card, hard disk). The recording medium 200 is a recording medium to record captured images, such as a memory card, and is constituted of a semiconductor memory, a magnetic disk, or the like.

A communication unit 54 transmits/receives video signals and sound signals to/from an external device connected wirelessly or via cable. The communication unit 54 is also connectable with a wireless Local Area Network (LAN) and Internet. The communication unit 54 can also communicate with an external device via Bluetooth (registered trademark) or Bluetooth Low Energy. The communication unit 54 can transmit an image (including an LV image) captured by the imaging unit 22 and an image recorded in the recording medium 200, and can receive image data and various other information from an external device.

An attitude detection unit 55 detects an attitude of the digital camera 100 with respect to the direction of gravity. Based on the attitude detected by the attitude detection unit 55, it can be determined whether an image captured by the imaging unit 22 is an image that was captured by the digital camera 100 held horizontally or an image that was captured by the digital camera 100 held vertically. The system control unit 50 can attach the orientation information, which is in accordance with the attitude detected by the attitude detection unit 55, to an image file of an image captured by the imaging unit 22, or can rotate and record the image. For the attitude detection unit 55, an acceleration sensor, a gyro sensor, or the like can be used. The motion of the digital camera 100 (e.g. pan, tilt, lift, still) can also be detected using the acceleration sensor or gyro sensor of the attitude detection unit 55.

An eye approach detection unit 57 is an eye approach detection sensor that detects approach (contact) and withdrawal (release) of an eye (object) 161 to/from the eyepiece unit 16 of an eyepiece finder 17 (hereafter simply referred to as "finder"). The system control unit 50 switches the display unit 28 and the EVF 29 between the display (display state) and the non-display (non-display state) in accordance with the state detected by the eye approach detection unit 57. Specifically, in a case where the digital camera 100 is at least in the image capturing standby state and the display destination switching setting is in automatic switching, the display destination is set to the display unit 28 so that display of the display unit 28 is ON and the EVF 29 is set to non-display, in the non-eye approaching state. In the eye approaching state, on the other hand, the display destination is set to the EVF 29 so that display of the EVF 29 is ON, and the display unit 28 is set to non-display. For the eye approach detection unit 57, an infrared proximity sensor, for example, can be used, so as to detect the approach of an object to the eyepiece unit 16 of the finder 17 which includes the EVF 29. When an object approaches, the infrared light emitted from a light-emitting unit (not illustrated) of the eye approach detection unit 57 is reflected by the object, and is received by a light-receiving unit (not illustrated) of the infrared proximity sensor. The distance of the object to the eyepiece unit 16 (eye approach distance) can also be determined by the amount of the received infrared light. In this way, the eye approach detection unit 57 performs eye approach detection to detect the proximity distance of the object to the eyepiece unit 16. It is assumed that eye approach is detected in the case where an object that approaches the eyepiece unit 16 a predetermined distance or less is detected after the non-eye approaching state (non-eye contact state). It is also assumed that eye withdrawal is detected in the case where an object, of which approach was detected, moved away from the eye approaching state (eye contact state) by at least a predetermined distance. The threshold to detect the eye approach and the threshold to detect the eye withdrawal may be differentiated by hysteresis, for example. After the eye approach is detected, it is assumed that the eye approaching state continues until the eye withdrawal is detected. Then after the eye withdrawal is detected, it is assumed that the non-eye approaching state continues until the eye approach is detected. It should be noted that the infrared proximity sensor is merely an example, and another type of sensor may be used for the eye approach detection unit 57, as long as the sensor can detect the approach of an eye or an object that can be regarded as an eye approach.

The system control unit 50 can detect the following operations performed on the eyepiece unit 16, or the state thereof, by controlling the gaze determination unit 170 or the eye approach detection unit 57. 1) A line-of-sight not directed to the eyepiece unit 16 is turned to the eyepiece unit 16 (that is, start of the light-of-sight input). 2) A line-of-sight is being inputted to the eyepiece unit 16. 3) The eyepiece unit 16 is being gazed into. 4) A line-of-sight directed to the eyepiece unit 16 is turned away from (that is, end of the line-of-sight input). 5) A line-of-sight is not inputted into the eyepiece unit 16.

These operations, states and positions (directions) of the line-of-sight with respect to the eyepiece unit 16 are notified to the system control unit 50 via an internal bus, and based on the notified information, the system control unit 50 determines the kind of operation (line-of-sight operation) that was performed on the eyepiece unit 16.

The operation unit 70 is an input unit that receives an operation performed by the user (user operation), and is used to input various operation instructions to the system control unit 50. As illustrated in FIG. 2, the operation unit 70 includes the mode selection switch 60, the shutter button 61, the power switch 72 and the touch panel 70a. The operation unit 70 also includes other operation members 70b, which are the main electronic dial 71, the sub-electronic dial 73, the four-direction key 74, the SET button 75, the video button 76, the AE lock button 77, the magnifying button 78, the reproduction button 79, the menu button 81, and the like.

The mode selection switch 60 switches the operation mode of the system control unit 50 to a still image capturing mode, a moving image capturing mode, a reproduction mode, or the like. The modes included in the still image capturing mode are: auto image capturing mode, auto scene determination mode, manual mode, aperture priority mode (Av mode), shutter speed priority mode (Tv mode) and program AE mode (P mode). Various scene modes and custom modes, to perform image capturing settings for each image capturing scene, are also included. The user can directly select any one of these modes using the mode selection switch 60. The user may also select an image capturing mode list screen using the mode selection switch 60 first, then select any one of the plurality of modes displayed on the list using another operation member. In the same manner, a plurality of modes may be included in the moving image capturing mode.

The shutter button 61 includes a first shutter switch 62 and a second shutter switch 64. The first shutter switch 62 is turned ON in mid-operation of the shutter button 61, that is, in the half-depressed state (image capturing preparation instruction), and generates a first shutter switch signal SW1. By the first shutter switch signal SW1, the system control unit 50 starts an image capturing preparation operation, such as auto focus (AF) processing, auto exposure (AE) processing, auto white balance (AWB) processing, and pre-flash emission (EF) processing. The second shutter switch 64 is turned ON when the operation of the shutter button 61 completes, that is, in the fully-depressed state (image capturing instruction), and generates a second shutter switch signal SW2. By the second shutter switch signal SW2, the system control unit 50 starts a series of operations of the image capturing processing, from reading signals from the imaging unit 22 to writing the captured image to the recording medium 200, as an image file.

The touch panel 70a and the display unit 28 may be integrated. For example, the touch panel 70a is configured so that the transmittance of the light does not interfere with the display on the display unit 28, and is superimposed on the upper layer of the display surface of the display unit 28. Then the input coordinates on the touch panel 70a are corresponded with the display coordinates on the display surface of the display unit 28. Thereby a graphical user interface (GUI), which allows the user to directly operate the screen displayed on the display unit 28, can be provided. The system control unit 50 can detect the following operations on the touch panel 70a or the states thereof.

1) A finger or pen which is not touching the touch panel 70a touches the touch panel 70a, that is, touch starts (hereafter Touch-Down). 2) A finger or pen is touching the touch panel 70a (hereafter Touch-On). 3) A finger or pen is moving in the state of touching the touch panel 70a (hereafter Touch-Move). 4) A finger or pen, which is touching the touch panel 70a, is released from the touch panel 70a, that is, touch ends (hereafter Touch-Up). 5) Nothing is touching the touch panel 70a (hereafter Touch-Off).

When Touch-Down is detected, Touch-On is also detected at the same time. Unless Touch-Up is detected after Touch-Down, Touch-On is normally detected continuously. When Touch-Move is detected as well, Touch-On is detected at the same time. Even if Touch-On is detected, Touch-Move is not detected unless the touch position is moving. Touch-Off is detected when Touch-Up of all fingers or pen is detected.

These operations, states and coordinates of the positions of the fingers or pen touching the touch panel 70a are notified to the system control unit 50 via the internal bus. Then based on the notified information, the system control unit 50 determines the type of operation (touch operation) that was performed on the touch panel 70a. For Touch-Move, the system control unit 50 can also determine the moving direction of the fingers or pen moving on the touch panel 70a, based on the changes of the positional coordinates, for the vertical components and the horizontal components on the touch panel 70a respectively. If Touch-Move is detected for at least a predetermined distance, the system control unit 50 determines that the slide operation was performed. An operation of quickly moving a finger on the touch panel 70a for a certain distance in the touched state and then releasing the finger is called "flick". In other words, flick is an operation of moving and releasing a finger rapidly on the touch panel 70a. If Touch-Move is detected for at least a predetermined distance at a predetermined speed or faster, and Touch-Up is detected hereafter, the system control unit 50 determines that flick was performed (determines that flick was performed after the slide operation). Further, a touch operation of touching a plurality of points (e.g. two points) simultaneously and moving these touch positions closer together is called "Pinch-In", and a touch operation of moving these touch positions further apart is called "Pinch-Out". Pinch-In and Pinch-Out are collectively called a "pinch operation" (or simply "pinch"). For the touch panel 70a, various types of touch panels may be used, such as a resistive film type, a capacitive type, a surface acoustic wave type, an infrared type, an electro magnetic indication type, an image recognition type and an optical sensor type. There is a type of detecting touch when the touch panel is actually contacted, and a type of detecting touch when a finger or pen approaches the touch panel, and either type may be used.

<Processing of Selecting Distance Measuring Point>: Processing to select a distance measuring point according to the first embodiment, which uses gaze determination time in accordance with the eye approach distance in the digital camera 100, will be described with reference to FIG. 3. In the first embodiment, it is assumed that "distance" refers to an interval (a distance) between two objects (length of space between two objects).

Figure 3:
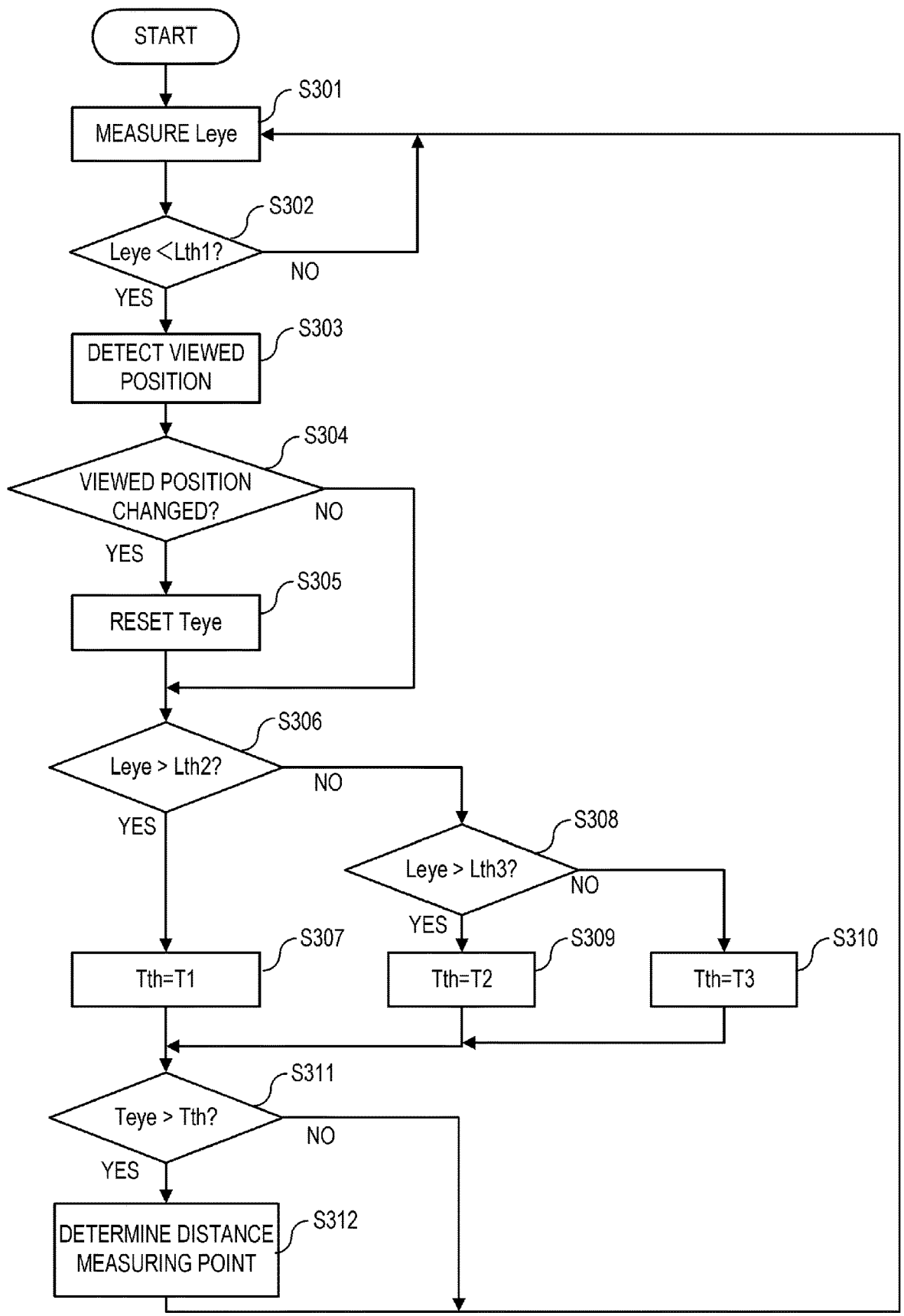
FIG. 3 is a flow chart depicting a processing of selecting a distance measuring point according to the first embodiment.

FIG. 3 is a flow chart depicting the processing of selecting a distance measuring point according to the first embodiment. In the first embodiment, in the digital camera 100, a gaze determination time Tth, which is a threshold to determine whether a gaze occurred (a predetermined threshold), is switched in accordance with the distance between the eye 161 of the user and the line-of-sight detection unit 160. If the digital camera 100 according to the first embodiment is used, the user can appropriately select a distance measuring point while peeping through the EVF 29, even in a situation where the position of the eye of the user can move. Each processing in the flow chart in FIG. 3 is implemented by the system control unit 50, which develops each program stored in the non-volatile memory 56 in the system memory 52, and executes the program so as to control each functional unit. The flow chart in FIG. 3 is started when the power switch 72 is turned ON and the digital camera 100 is started.

In S301, the system control unit 50 controls the eye approach detection unit 57 and measures (acquires) the distance Leye between the eye 161 of the user and the line-of-sight detection unit 160. The distance Leye between the eye 161 of the user and the line-of-sight detection unit 160 may be an optical distance (distance information) between the eye 161 of the user and the line-of-sight detection sensor 164. In the first embodiment, the line-of-sight detection unit 160 and the eyepiece unit 16 are disposed adjacent to each other, hence the distance Leye may be regarded as a distance between the eye 161 of the user and the eyepiece unit 16 (eye approach detection unit 57).

In S302, the system control unit 50 determines whether the distance Leye measured in S301 is less than a first threshold Lth1. If the distance Leye is less than the first threshold Lth1, the system control unit 50 determines that the eye of the user approached the eyepiece unit 16 (finder). If the distance Leye is at least the first threshold Lth1, on the other hand, the system control unit 50 determines the state as the non-eye approaching state. Processing advances to S303 if the distance Leye is less than the first threshold Lth1, or returns to S301 if not. In other words, the processing steps S301 and S302 are repeated until the state where the eye of the user approached the eyepiece unit 16 is detected.

In S303, the system control unit 50 controls the line-of-sight detection unit 160 and detects the viewed position (position viewed in the EVF 29) of the user. In this case, the viewed position need not be detected in pixel units in the EVF 29, but may be detected as a block dividing the display range in the EVF 29, or may be detected as an object. The system control unit 50 stores the detected viewed position in the memory 32, so as to correspond with the detected time.

In S304, the system control unit 50 determines whether the viewed position detected this time in S303 is different from the viewed position detected the last time in S303, which is stored in the memory 32. In a case where the processing performed this time in S303 is the first time, the memory 32 does not store the information on the viewed position detected the last time, hence the system control unit 50 determines that the viewed positions between the last time and this time are different. Processing advances to S305 if the viewed positions between this time and the last time are different, or to S306 if not. Here the system control unit 50 can determine that, from among the plurality of viewed positions stored in the memory 302, the viewed position in the last time is the viewed position linked to the time closest to the time linked to the viewed position this time.

In a case where the resolution in the viewed position is high (e.g. in a case where the viewed position is acquired in pixel units), it is determined that the viewed position changed from the viewed position the last time if the viewed position by the user slightly shifted. Therefore, in the case where resolution in the viewed position is high, it may be regarded that the viewed position is the same as the last time if the viewed position this time is within a predetermined range from the viewed position the last time.

In S305, the system control unit 50 reset a gaze timer Teye, which measures the duration when the viewed position does not change continuously (sets the gaze timer Teye to 0).

In S306, the system control unit 50 determines whether the distance Leye measured in S301 is larger than a second threshold Lth2. The second threshold Lth2 here is a value smaller than the first threshold Lth1. Processing advances to S307 if the distance Leye is larger than the second threshold Lth2, or to S308 if not.

In S307, the system control unit 50 sets a first determination time T1 to the gaze determination time Tth.

In S308, the system control unit 50 determines whether the distance Leye measured in S301 is larger than a third threshold Lth3. The third threshold Lth3 here is a value smaller than the second threshold Lth2. In other words, Lth1>Lth2>Lth3 is established. An example thereof is Lth1=10 mm, Lth2=5 mm and Lth3=3 mm. Processing advances to S309 if the distance Leye is larger than the third threshold Lth3, or to S310 if not.

In S309, the system control unit 50 sets a second determination time T2 for the gaze determination time Tth. In S310, the system control unit 50 sets a third determination time T3 for the gaze determination time Tth. Here the second determination time T2 is shorter than the first determination time T1. Further, the third determination time T3 is shorter than the second determination time T2. In other words, T1>T2>T3 is established.

In S311, the system control unit 50 controls the gaze determination unit 170 and determines whether the value of the gaze timer Teye is larger than the gaze determination time Tth. In other words, the system control unit 50 (gaze determination unit 170) determines whether the time during which the viewed position does not change continuously is longer than the gaze determination time Tth, and determines that the viewed position is gazed if longer than the gaze determination time Tth. Processing advances to S312 if the value of the gaze timer Teye is larger than the gaze determination time Tth, or returns to S301 if not.

In S312, the system control unit 50 determines (selects) the distance measuring point at a position in accordance with the viewed position (gaze position). In the first embodiment, the system control unit 50 determines the distance measuring point in S312, but an icon displayed at the viewed position (gaze position) may be selected, and an image centered around the viewed position may be magnified or demagnified.

Furthermore, the system control unit 50 may control the EVF 29 so as to display the gaze position (display a display item that indicates the gaze position). In other words, in S312, the system control unit 50 may perform any processing as long as the processing is in response to the occurrence of gaze.

Figure 4:
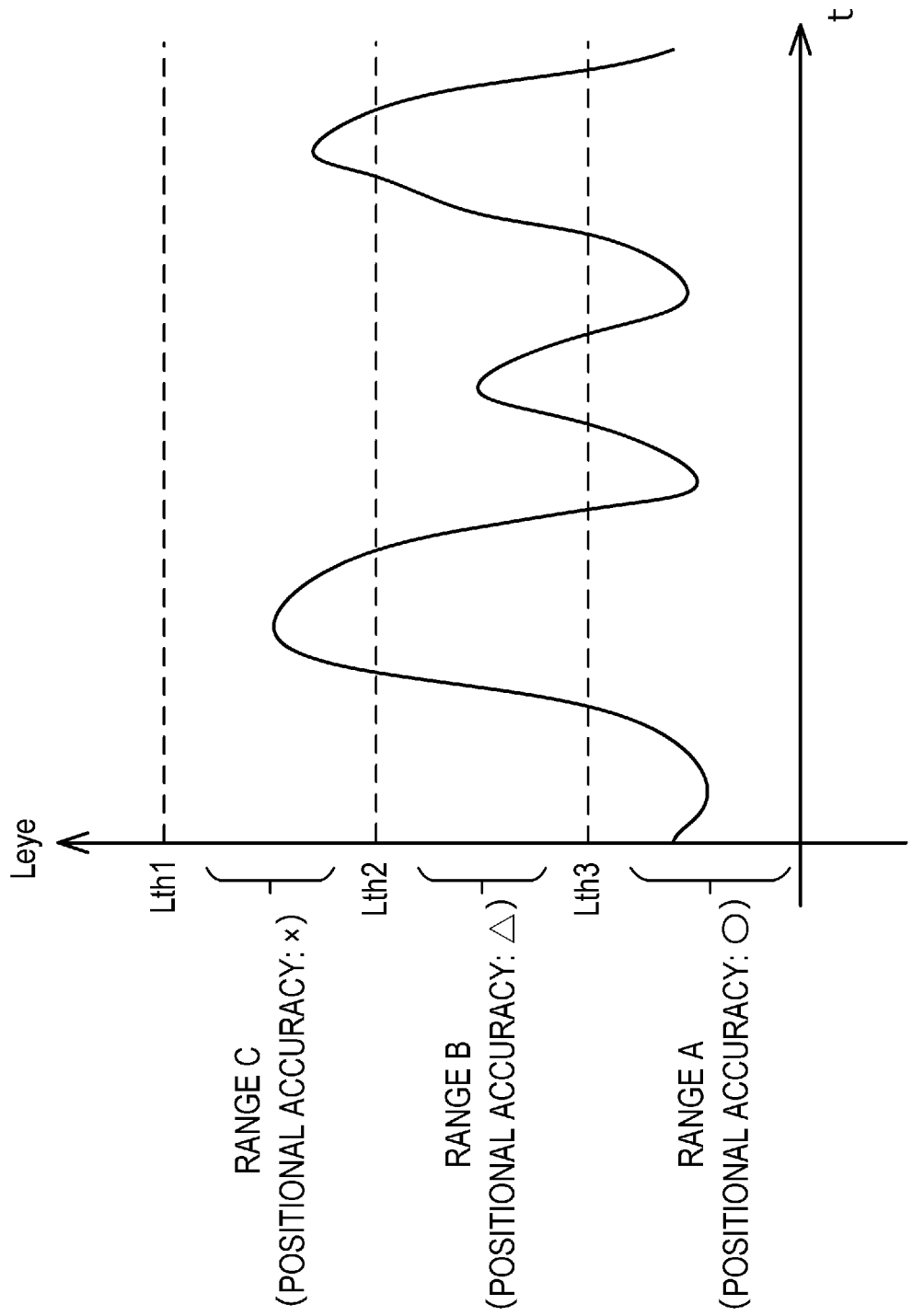
FIG. 4 is a diagram for describing a reason for changing the gaze determination time according to the first embodiment.

(Reason for Changing Gaze Determination Time in Accordance with Distance): A reason why the gaze determination time Tth is changed in accordance with the value of the distance Leye will be described with reference to FIG. 4. FIG. 4 is a diagram depicting a temporal change of the distance Leye between the eye 161 of the user and the line-of-sight detection unit 160.

A case where the distance Leye is larger than the second threshold Lth2 (a case where the distance Leye is in a range C) may indicate a state in which the eye of the user is obviously distant from the finder due to a camera shake or the like. For example, when the distance between the eye 161 of the user and the line-of-sight detection unit 160 is long, a slight movement of the eye 161 of the user considerably moves the viewed position to be detected by the line-of-sight detection unit 160. Specifically, the viewed position to be detected may be moved considerably by an involuntary eye movement during fixation, which is a movement of the eye unintended by the user. This means that in the case where the distance Leye is in the range C, the detection accuracy of the line-of-sight detection unit 160 to detect the viewed position is not very good. Therefore, the system control unit 50 sets the gaze determination time to be relatively long, so as to secure time to stabilize the detection accuracy of the line-of-sight detection unit 160, to detect the viewed position under good conditions. For example, in the case where the eye of the user is distant from the finder due to camera shake, the time to acquire an accurate viewed position can be secured if the first determination time T1 is about 100 ms to 1 s, since the cycle of camera shake is normally about 1 to 10 Hz. In a case where poor detection accuracy to detect the viewed position continues in a steady state, and not due to such cyclic changes as camera shake, the gaze determination time is set relatively long to avoid quick determination of the gaze position which leads to error, whereby operation unintended by the user can be prevented.

It should be noted that in the case where the distance Leye is larger than the second threshold Lth2 (in the case where the distance Leye is in the range C), the system control unit 50 may control the EVF 29 to display an alarm to the user in S307. The alarm display here may be an alarm to notify that accuracy of the line-of-sight detection is low, or an alarm to prompt to closely approach the eye to the finder. Further, in the case where the distance Leye is larger than the second threshold Lth2, the system control unit 50 may disallow (disable) receiving the line-of-sight input by the line-of-sight detection unit 160 in S307, without setting the gaze determination time Tth.

A case where the distance Leye is not more than the second threshold Lth2 and is larger than the third threshold Lth3 (a case where the distance Leye is in a range B) may indicate a state in which the eye of the user is a little distant from the finder due to camera shake or the like. In this way, in the case where the distance Leye is in the range B, the detection accuracy to detect the viewed position drops due to camera shake or the like, but the detection accuracy of the line-of-sight detection unit 160 to detect the viewed position is better than the case where the distance Leye is in the range C. Therefore the system control unit 50 sets a second determination time T2, which is shorter than the first determination time T1, to the gaze determination time Tth.

A case where the distance Leye is not more than the third threshold Lth3 (a case where the distance Leye is in a range A) may indicate a state in which the eye of the user is reliably approaching (fixed to) the finder. If the distance between the eye 161 of the user and the line-of-sight detection unit 160 is short at this time, the viewed position to be detected does not change very much even if the eye 161 of the user moves. For example, the viewed position is not changed very much by an involuntary eye movement during fixation. Therefore, in the case where the distance Leye is in the range A, the detection accuracy of the line-of-sight detection unit 160 to detect the viewed position is good. Hence the system control unit 50 sets a third determination time T3, which is shorter than the second determination time T2, as the gaze determination time Tth.

As described above, the detection accuracy to detect the viewed position is different depending on the distance between the line-of-sight detection unit 160 and the eye 161 of the user, hence if the gaze determination time is set in accordance with the distance, such processing as distance measuring point selection can be implemented as intended by the user.

In the first embodiment, the system control unit 50 changes the gaze determination time regardless the operation mode, but whether or not the gaze determination time is changed in accordance with the distance between the line-of-sight detection unit 160 and the eye 161 of the user may be switched (selected) depending on the operation mode. For example, when a still image is captured (still image capturing mode), a distance measuring point must be quickly selected, hence the system control unit 50 may set the gaze determination time to a short value (e.g. the third determination time T3) regardless the distance between the line-of-sight detection unit 160 and the eye 161 of the user. When a move image is captured (moving image capturing mode), on the other hand, the system control unit 50 controls so that the gaze determination time is changed in accordance with the distance between the line-of-sight detection unit 160 and the eye 161 of the user. Further, the gaze determination time may be determined to be short, regardless the distance between the line-of-sight detection unit 160 and the eye 161 of the user in both the moving image capturing mode and the still image capturing mode. In this case, in the edit mode to edit the captured images, where real-time operation is not required, the gaze determination time may be changed in accordance with the distance between the line-of-sight detection unit 160 and the eye 161 of the user. Furthermore, the system control unit 50 may set the gaze determination time in accordance with the distance between the line-of-sight detection unit 160 and the eye 161 of the user in both the still image capturing mode and the moving image capturing mode. In this case, the system control unit 50 may set the gaze determination time to be shorter in the still image capturing mode than in the moving image capturing mode, if the distance between the line-of-sight detection unit 160 and the eye 161 of the user is the same in these two modes.

In the detection of gaze position (viewed position) by the line-of-sight detection unit 160, if information related to the reliability (accuracy) of the detection of the viewed position can be acquired based on the detection results in the past or the like, the gaze determination time may be set based on this result. Specifically, the gaze determination time may be set shorter as the reliability of the detection of the viewed position in the past is higher, and be set longer as the reliability thereof is lower.

Further, in the first embodiment, the gaze determination time is changed depending on the distance (numeric value; distance information) between the line-of-sight detection unit 160 and the eye 161 of the user, but, with regard to the gaze time, the gaze determination time may be determined using an arithmetic expression based on the distance between the line-of-sight detection unit 160 and the eye 161 of the user. For example, a longer gaze determination time may be set as the distance between the line-of-sight detection unit 160 and the eye 161 of the user is longer. Specifically, the gaze determination time may be set such that the distance between the line-of-sight detection unit 160 and the eye 161 of the user is in proportion to the length of the gaze determination time. Further, in the first embodiment, the change amount of the distance between the eye 161 of the user and the line-of-sight detection unit 160 per unit time (inclination of graph in FIG. 4) may be used instead of the distance (numeric value; distance information) between the eye 161 of the user and the line-of-sight detection unit 160. In other words, the system control unit 50 may acquire the change amount of the distance between the eye 161 of the user and the line-of-sight detection unit 160 per unit time, and set the gaze determination time longer as this change amount is larger. This is because as the change amount of the distance between the eye 161 of the user and the line-of-sight detection unit 160, with respect to the temporal change, is larger, the positional relationship between the eye 161 of the user and the line-of-sight detection unit 160 is changing considerably, that is, the accuracy to acquire the viewed position decreases.

Furthermore, the detection accuracy of the line-of-sight detection unit 160 to detect the line-of-sight may become worse immediately after the eye of the user approached the eyepiece unit 16, compared with the other timings. Hence the system control unit 50 may change the gaze determination time in accordance with the duration of the eye approach. For example, in S302, the system control unit 50 may determine not only whether the eye of the user approached the eyepiece unit 16 (finder), but also determine the duration of the eye approach. In the case of determining the duration of the eye approach, the system control unit 50 sets the gaze determination time longer as the duration of the eye approach is shorter. If the duration of the eye approach is shorter than a predetermined time, the system control unit 50 may set the first gaze time T1 or a time longer than T1 to the gaze determination time, regardless the distance between the eye and the line-of-sight detection unit 160.

Second Embodiment

Processing of a digital camera 100 to select a distance measuring point according to the second embodiment will be described with reference to FIG. 5. The configuration of the digital camera 100 according to the second embodiment is the same as the digital camera 100 according to the first embodiment, hence description thereof is omitted.

Most electronic devices (line-of-sight input devices) that can be used as the line-of-sight detection unit 160 requires calibration (correction of parameters which the line-of-sight detection unit 160 uses for line-of-sight detection; correction of correspondence between the direction of the eye of the user and the viewed position). One reason why calibration is required is that a difference is generated in the detection result of the viewed position if the distance between the line-of-sight input device and the detection target eye changes. Therefore, calibration is executed in advance in the state of using the digital camera 100, whereby detection accuracy of the viewed position (line-of-sight) is ensured. However, in the case of the digital camera 100, the positional relationship between the digital camera 100 and the user easily changes, and in some cases, it is difficult to maintain the same positional relationship even if the calibration is executed in advance. For example, when the digital camera 100 is used in an image capturing environment where camera shake or user movement easily occurs, it is difficult to maintain the same positional relationship between the user and the digital camera.

Therefore in the second embodiment, the digital camera 100, which not only uses the result of calibration but also considers the change of positional relationship in terms of the distance between the eye 161 of the user and the line-of-sight detection unit 160, will be described. The digital camera 100 according to the second embodiment switches the gaze determination time Tth based on the distance between the eye 161 of the user and the line-of-sight detection unit 160 at a timing when the line-of-sight detection unit 160 executed the calibration.

Figure 5:
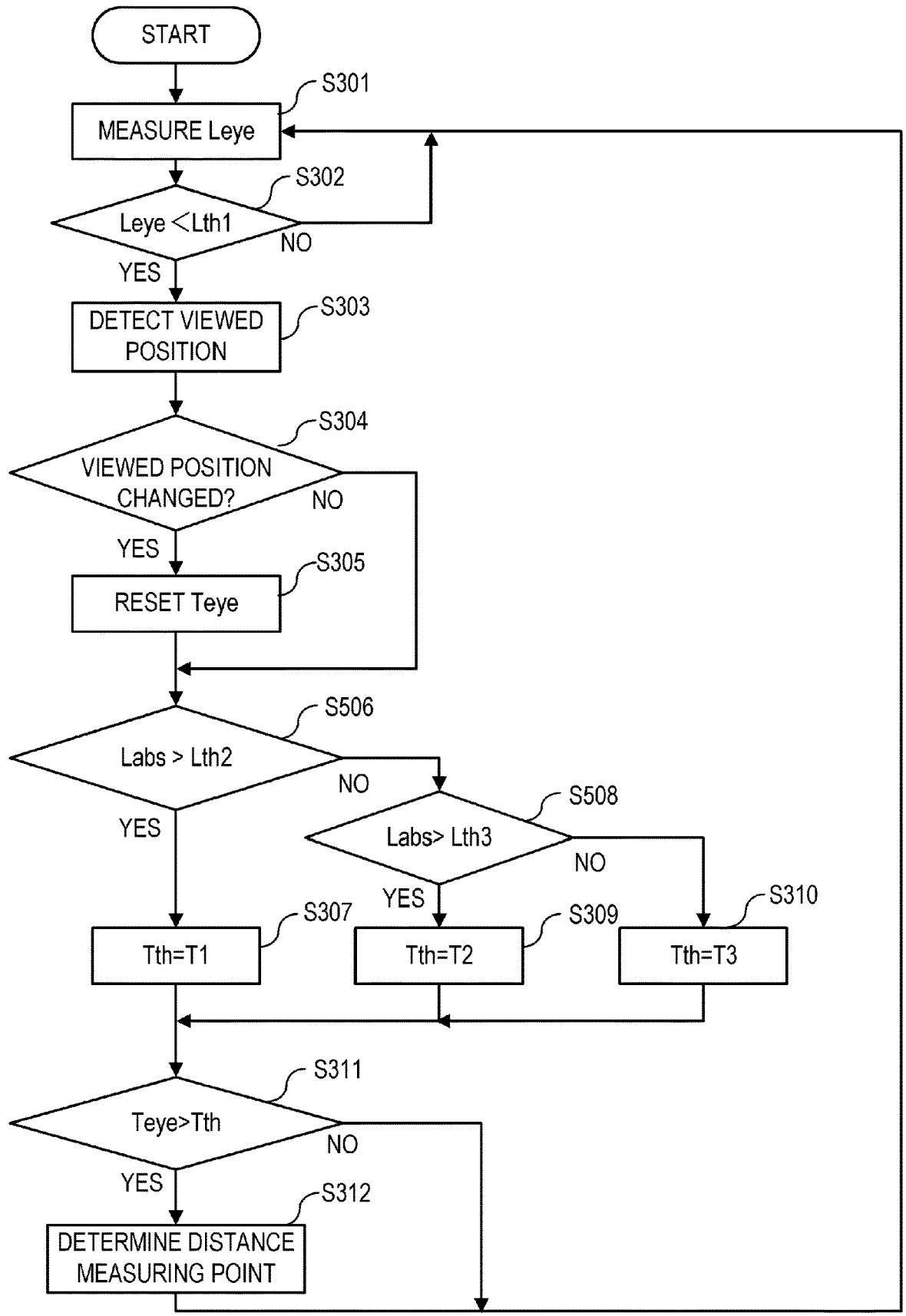
FIG. 5 is a flow chart depicting a processing of selecting a distance measurement point according to a second embodiment.

FIG. 5 is a flow chart depicting the processing of selecting a distance measuring point according to the second embodiment. Each processing in a flow chart in FIG. 5 is implemented by the system control unit 50, which develops the program stored in the non-volatile memory 56 in the system memory 52, and executes the program so as to control each functional unit. The flow chart in FIG. 5 is started when the digital camera 100 is started and the system control unit 50 completes to execute the calibration. When the calibration is executed by controlling the eye approach detection unit 57, the system control unit 50 measures (acquires) the distance Lcal between the eye 161 of the user and the line-of-sight detection unit 160 in advance. Then the system control unit 50 stores the distance Lcal acquired in the calibration to the memory 32. The processing steps S301 to S305 and S307 to S312 in FIG. 5 are the same as those of the flow chart in FIG. 3 according to the first embodiment, therefore description thereof is omitted.

In S506, the system control unit 50 determines whether an absolute difference Labs, which is an absolute value of the difference between the distance Leye measured in S301 and the distance Lcal (|Leye−Lcal|) is larger than the second threshold Lth2. Processing advances to S307 if the absolute difference Labs is larger than the second threshold Lth2, or to S508 if not.

In S508, the system control unit 50 determines whether the absolute difference Labs is larger than the third threshold Lth3. Processing advances to S309 if the absolute value Labs is larger than the third threshold Lth3, or to S310 if not.

A case where the absolute value Labs is larger than the second threshold Lth2 indicates a state in which the positional relationship between the eye 161 of the user and the line-of-sight detection unit 160 considerably deviated from that in the calibration time, hence the detection accuracy of the line-of-sight detection unit 160 to detect the viewed position, may be poor. Therefore, in S307, the system control unit 50 sets the gaze determination time Tth to the first determination time T1, which is a large value.

A case where the absolute value Labs is not more than the second threshold Lth2 and is larger than the third threshold Lth3 indicates a state in which the positional relationship between the eye 161 of the user and the line-of-sight detection unit 160 slightly deviated from that in the calibration time. In this case, the detection accuracy of the line-of-sight detection unit 160 to detect the viewed position is may not be in a good state. Therefore, in S309, the system control unit 50 sets the gaze determination time Tth to the second determination time T2, which is a value smaller than the first determination time T1.

A case where the absolute value Labs is not more than the third threshold Lth3 indicates that the positional relationship between the eye and the digital camera 100 in the calibration can be maintained, hence the line-of-sight detection unit 160 can detect the viewed position accurately. Therefore, in S310, the system control unit 50 sets the gaze determination time Tth to the third determination time T3, which is the shortest determination time.

In this way, the gaze determination time is changed in accordance with the distance between the eye 161 of the user and the line-of-sight detection unit 160 in the calibration time and when the digital camera 100 is used. Thereby the distance measuring point can be selected based on the line-of-sight input with reflecting the calibration and as intended by the user.

In the second embodiment, the gaze determination time is changed depending on whether the difference of the distance between the eye 161 of the user and the line-of-sight detection unit 160 in the calibration time and the distance when the digital camera 100 is used is larger than the threshold or is not more than the threshold. However, instead of using this change method, the gaze time may be determined by an arithmetic expression based on the distance information. For example, a longer gaze determination time Tth may be set as the absolute value of the difference between the distance Leye and the distance Lcal is larger.

To set the gaze determination time Tth, it is not always necessary to use the absolute value (numeric value) of the difference between the distance Leye and the distance Lcal, as mentioned in the first embodiment. To set the gaze determination time Tth, the ratio (percentage) of the distance Leye with respect to the distance Lcal, that is, Leye/Lcal, may be used instead of the absolute value.

While the present invention has been described with reference to the preferred embodiments, the present invention is not limited to these specific embodiments, and includes various modes within a scope that does not depart from the essence of the invention. Furthermore, each of the abovementioned embodiments is merely an example of the present invention, and the embodiments may be combined when necessary.

For example, the eye approach detection by the eye approach detection unit 57 may be performed, not by an infrared proximity sensor, but by another distance measuring method, such as a laser. Further, in the above description, the distance between the line-of-sight detection unit 160 and the eye 161 of the user is acquired by the eye approach detection unit 57, but an acquisition unit that acquires the distance by comparing two images captured at two different positions, may be disposed. Furthermore, the above description of the embodiments is based on the assumption of using a camera, but the digital camera 100 is not limited to a camera, but may be an electronic device that includes an imaging function. For example, the present invention is applicable to an electronic device that is used in the state of being fixed to the head, such as a head mounted display (HMD), since the distance between the line-of-sight detection unit and the eye, determined in the mounted state, differs depending on the user or the mounting environment (wearing state, model, individual difference of spectacles).

According to the present invention, operation based on the line-of-sight input can be performed as intended by the user, even in a case where the positional relationship between the eye of the user and the electronic device changes.

<Other Embodiments>: Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-088583, filed on May 21, 2020, which is hereby incorporated by reference herein in its entirety.

What is claimed is:

1. An electronic device comprising at least one memory and at least one processor which function as:
    a line-of-sight detection unit configured to receive line-of-sight input from a user and detect a viewed position of the user;
    an acquisition unit configured to acquire first distance information that corresponds to a distance to an eye of the user; and
    a control unit configured to 1) set determination time based on the first distance information, and 2) determine that gaze has occurred, in a case where determination is made that the viewed position does not continuously change longer than the determination time.

2. The electronic device according to claim 1, wherein the control unit is further configured to set the determination time based on a change amount of the first distance information per unit time.

3. The electronic device according to claim 1, wherein the control unit is further configured to set the determination time based on the first distance information at a point in time when the control unit sets the determination time and the second distance information that corresponds to a distance to the eye of the user acquired in advance.

4. The electronic device according to claim 3, wherein
the control unit is further configured to executes calibration for the line-of-sight detection unit before setting the determination time, and
the second distance information is information that corresponds to the distance to the eye of the user at a point in time when the control unit has executed the calibration.

5. The electronic device according to claim 3, wherein the control unit is further configured to set the determination time based on an absolute value of a difference between a distance corresponding to the first distance information and a distance corresponding to the second distance information.

6. The electronic device according to claim 3, wherein the control unit is further configured to set the determination time based on a ratio of a distance corresponding to the first distance information and a distance corresponding to the second distance information.

7. The electronic device according to claim 1, wherein the control unit is further configured to set the determination time based on reliability of past detection of viewed positions by the line-of-sight detection unit.

8. The electronic device according to claim 1, further comprising a finder to which the eye of the user approaches, wherein
the control unit is further configured to acquire time during which the eye of the user is approaching the finder continuously, and sets the determination time based on the acquired time.

9. The electronic device according to claim 1, wherein in a case where a numeric value based on the first distance information is larger than a predetermined threshold, the control unit controls the line-of-sight detection unit such that line-of-sight input by the user is not received.

10. The electronic device according to claim 1, wherein in a case where a numeric value based on the first distance information is larger than a predetermined threshold, the control unit sets the determination time longer than in a case where the numeric value is not more than the predetermined threshold.

11. The electronic device according to claim 1, wherein in a case where a numeric value based on the first distance information is larger than a predetermined threshold, the control unit controls a display to display an alarm to the user.

12. The electronic device according to claim 1, wherein in a case where it is determined that the gaze has occurred, the control unit further performs processing in accordance with a gaze position, which is a viewed position at a point in time when it is determined that the gaze has occurred.

13. The electronic device according to claim 12, wherein in the case where it is determined that the gaze has occurred, the control unit sets a distance measuring point to a position in accordance with the gaze position.

14. The electronic device according to claim 12, wherein in the case where it is determined that the gaze has occurred, the control unit controls a display to display the gaze position.

15. The electronic device according to claim 1, wherein
the electronic device includes a first mode and a second mode,
in the first mode, the control unit sets the determination time based on the first distance information, and
in the second mode, the control unit sets determination time without relying on the first distance information.

16. The electronic device according to claim 15, wherein
the first mode is a mode in which a moving image is captured, and
the second mode is a mode in which a still image is captured.

17. The electronic device according to claim 1, wherein the distance to the eye of the user is a distance between the eye of the user and the line-of-sight detection unit, or a distance between the eye of the user and a finder to which the eye of the user approaches.

18. A control method of an electronic device including a line-of-sight detection unit configured to receive line-of-sight input from a user and detect a viewed position of the user, the method comprising:
an acquisition step of acquiring first distance information that corresponds to a distance to an eye of the user; and
a control step of 1) setting determination time based on the first distance information and 2) determining that gaze has occurred in a case where determination is made that the viewed position does not continuously change longer than the determination time.

19. A non-transitory computer-readable storage medium storing a program for causing a computer to execute a control method,
the control method being a control method of an electronic device including a line-of-sight detection unit configured to receive line-of-sight input from a user and detect a viewed position of the user, and comprising:
an acquisition step of acquiring first distance information that corresponds to a distance to an eye of the user; and
a control step of 1) setting determination time based on the first distance information and 2) determining that gaze has occurred in a case where determination is made that the viewed position does not continuously change longer than the determination time.

* * * * *